(12) United States Patent
Hirooka et al.

(10) Patent No.: US 10,875,489 B2
(45) Date of Patent: Dec. 29, 2020

(54) GAS GENERATOR (71) Applicant: DAICEL CORPORATION, Osaka (JP)

(72) Inventors: Masato Hirooka, Tatsuno (JP); Koji Yamamoto, Tatsuno (JP)

(73) Assignee: DAICEL CORPORATION, Osaka (JP)

(*) Notice: Subject to any disclaimer, the term of this patent is extended or adjusted under 35 U.S.C. 154(b) by 104 days.

(21) Appl. No.: 16/093,325

(22) PCT Filed: Apr. 21, 2017

(86) PCT No.: PCT/JP2017/015981
§ 371 (c)(1),
(2) Date: Oct. 12, 2018

(87) PCT Pub. No.: WO2017/199684
PCT Pub. Date: Nov. 23, 2017

(65) Prior Publication Data
US 2019/0135222 A1 May 9, 2019

(30) Foreign Application Priority Data

May 18, 2016 (JP) .................................. 2016-099221

(51) Int. Cl.
*B60R 21/264* (2006.01)
*B60R 21/261* (2011.01)
(Continued)

(52) U.S. Cl.
CPC .......... *B60R 21/264* (2013.01); *B60R 21/261* (2013.01); *B60R 21/272* (2013.01);
(Continued)

(58) Field of Classification Search
CPC ... B60R 21/264; B60R 21/272; B60R 21/261; B60R 2021/2725; B60R 2021/2633;
(Continued)

(56) References Cited

U.S. PATENT DOCUMENTS 5,346,254 A * 9/1994 Esterberg ............ B60R 21/2644
280/741
5,387,007 A * 2/1995 Ogawa ................ B60R 21/2644
102/530
(Continued)

FOREIGN PATENT DOCUMENTS

JP        2013-193550 A    9/2013
WO    WO 2007/032387 A1    3/2007

OTHER PUBLICATIONS

International Search Report (PCT/ISA/210) issued in PCT/JP2017/015981, dated Jul. 25, 2017.
(Continued)

*Primary Examiner* — Timothy Wilhelm
(74) *Attorney, Agent, or Firm* — Birch, Stewart, Kolasch & Birch, LLP (57) ABSTRACT

The present invention provides a gas generator, including an outer shell housing having a top plate, a bottom plate and a circumferential wall provided with a gas discharge port, a combustion chamber accommodating a gas generating agent, a cylindrical filter and an ignition device disposed in a cup-shaped ignition device chamber housing, the bottom surface of the cup-shaped ignition device chamber housing facing the top plate and an end surface of the opening thereof abutting against the bottom plate, a length from an upper end surface to a lower end surface of the cylindrical filter being shorter than a distance from the top plate to the bottom plate of the outer shell housing, and the cylindrical filter being disposed such that the upper end surface faces the top plate and the lower end surface faces the combustion chamber, a (Continued)

cup-shaped cover member which has a bottom surface, a circumferential wall and an opening, further being disposed between the cup-shaped ignition device chamber housing and the cylindrical filter.

4 Claims, 4 Drawing Sheets

(51) Int. Cl.
    *B60R 21/272*     (2006.01)
    *B60R 21/26*     (2011.01)
    *B60R 21/263*     (2011.01)

(52) U.S. Cl.
    CPC .............. *B60R 2021/26011* (2013.01); *B60R 2021/26029* (2013.01); *B60R 2021/2633* (2013.01); *B60R 2021/2725* (2013.01)

(58) Field of Classification Search
    CPC   B60R 2021/26029; B60R 2021/26011; B60Y 2410/10
    See application file for complete search history.

(56) References Cited

U.S. PATENT DOCUMENTS

| | | | | |
|---|---|---|---|---|
| 6,227,565 B1* | 5/2001 | McFarland | ......... | B60R 21/2644 102/531 |
| 6,234,521 B1* | 5/2001 | Katsuda | ............. | B01D 46/2411 280/736 |
| 6,257,617 B1* | 7/2001 | McFarland | ........... | B60R 21/261 280/736 |
| 6,315,322 B1* | 11/2001 | Mika | ................... | B60R 21/2644 280/736 |
| 6,540,256 B2* | 4/2003 | Iwai | ......................... | C06D 5/06 280/736 |
| 6,543,805 B2* | 4/2003 | McFarland | ......... | B60R 21/2644 280/736 |
| 6,644,206 B2* | 11/2003 | Fogle, Jr. | ............ | B60R 21/2644 102/530 |
| 6,854,395 B2* | 2/2005 | Katsuda | ............. | B60R 21/2644 102/530 |
| 6,886,856 B2* | 5/2005 | Canterberry | ........ | B60R 21/2644 102/531 |
| 6,945,561 B2* | 9/2005 | Nakashima | ......... | B60R 21/2644 102/531 |
| 7,207,597 B2* | 4/2007 | Iwai | .................... | B60R 21/2644 102/531 |
| 7,578,522 B2* | 8/2009 | Hanano | ............... | B60R 21/2644 102/531 |
| 7,614,875 B2* | 11/2009 | Katsuda | .................. | B60R 21/26 280/728.1 |
| 7,806,954 B2* | 10/2010 | Quioc | ................. | B60R 21/2644 102/202.14 |
| 8,585,086 B2* | 11/2013 | Yamazaki | ........... | B60R 21/2644 102/530 |
| 8,714,091 B2* | 5/2014 | Kobayashi | .......... | B60R 21/2644 102/530 |
| 8,777,258 B2 | 7/2014 | Kobayashi et al. | | |
| 8,801,034 B2* | 8/2014 | Ukita | .................... | B60R 21/264 280/741 |
| 9,487,182 B2* | 11/2016 | Katsuta | ............... | B60R 21/2644 |
| 9,624,140 B2* | 4/2017 | Fujisaki | .................. | C06D 5/06 |
| 2003/0051630 A1* | 3/2003 | Katsuda | ............. | B60R 21/2644 102/531 |
| 2004/0046373 A1* | 3/2004 | Wang | .................... | B60R 21/261 280/741 |
| 2004/0051289 A1* | 3/2004 | Miyaji | ................. | B60R 21/2644 280/741 |
| 2004/0061319 A1* | 4/2004 | Saso | ................... | B60R 21/2644 280/741 |
| 2006/0267322 A1* | 11/2006 | Eckelberg | ............... | B60R 21/26 280/736 |
| 2008/0118408 A1* | 5/2008 | Numoto | .............. | B60R 21/2644 422/167 |
| 2009/0115175 A1* | 5/2009 | Nishimura | .......... | B60R 21/2644 280/741 |
| 2011/0088583 A1* | 4/2011 | Morgan | ................... | B60R 21/26 102/530 |
| 2011/0193330 A1* | 8/2011 | Kobayashi | .......... | B60R 21/2644 280/741 |
| 2013/0239839 A1 | 9/2013 | Yamazaki et al. | | |
| 2017/0043742 A1* | 2/2017 | Ueda | ................... | B60R 21/2644 |

OTHER PUBLICATIONS

Written Opinion (PCT/ISA/237) issued in PCT/JP2017/015981, dated Jul. 25, 2017.
English translation of the Written Opinion of the International Searching Authority(Form PCT/ISA/237), dated Jul. 25, 2017 for International Application No. PCT/JP2017/015981.

* cited by examiner

GAS GENERATOR

TECHNICAL FIELD

The present invention relates to a gas generator used for an airbag apparatus.

BACKGROUND OF THE INVENTION

There are gas generators used in airbag apparatuses, in which a gas generating agent is used as a gas generating source. During actuation of a gas generator, a gas generating agent inside a housing is burned to generate a high-temperature combustion gas, and combustion residues (including, for example, a metal in a molten state) adhere to a top plate of the housing, thereby causing the top plate to be in an extremely high temperature.

An airbag is designed to contract after deployment for protecting an occupant, and if the airbag which contracts after expanding touches the top plate of the housing, the airbag may be melted and become inflamed. In view of the above, it is desirable that the top plate of the housing is prevented from becoming heated too much.

An invention according to U.S. Pat. No. 6,234,521 B1 is a gas generator. In a housing 463 of the gas generator shown in FIG. 17, an igniter 464, a gas generating agent 466 to be ignited and burned by the igniter 464 and a cylindrical coolant/filter 467 are disposed, and a plate member 491 is arranged on top of a combustion chamber 484. The plate member 491 includes a circular portion 492 and a circumferential wall 493 extending in an axial direction from an outer edge of the circular portion 492, and the plate member 491 functions to position the coolant/filter 467 and to close a gap between the coolant/filter 467 and a circular portion 478 of a diffuser shell 461.

An invention according to U.S. Pat. No. 8,714,091 B2 is a gas generator in which a cup-shaped container 31 forming an ignition device chamber 30 is disposed inside a housing 10, an outside of the cup-shaped container 31 is defined as a combustion chamber 40, and an annular filter 70 is disposed on an upper side of the combustion chamber 40.

In an invention according to U.S. Pat. No. 8,585,086 B2, a first support member 60 having a disk-shaped portion 62 and an annular wall 64 is disposed between a filter 50 and a top plate 11a of a diffuser 11. The disk-shaped portion 62 has communication holes, and a combustion gas passes therethrough during actuation, so that it is prevented that the first support member 60 deforms due to a pressure difference.

SUMMARY OF INVENTION

A first aspect of the present invention (hereinafter, referred to as a "first aspect") provides a gas generator, including:

an outer shell housing having a top plate, a bottom plate and a circumferential wall provided with a gas discharge port;

in the outer shell housing, a combustion chamber accommodating a gas generating agent, a cylindrical filter, and an ignition device disposed in a cup-shaped ignition device chamber housing;

the combustion chamber being a space inside the outer shell housing excluding the cup-shaped ignition device chamber housing and the cylindrical filter;

the cup-shaped ignition device chamber housing having a bottom surface, a circumferential wall and an opening and being disposed such that the bottom surface thereof faces the top plate of the outer shell housing and an end surface of the opening thereof abuts against the bottom plate of the outer shell housing;

a length from an upper end surface to a lower end surface of the cylindrical filter being shorter than a distance from the top plate to the bottom plate of the outer shell housing, and the cylindrical filter being disposed along a central axis of the outer shell housing such that the upper end surface faces the top plate and the lower end surface faces the combustion chamber;

a cup-shaped cover member being further disposed between the cup-shaped ignition device chamber housing and the cylindrical filter;

the cup-shaped cover member having a bottom surface, a circumferential wall and an opening; and the ignition device chamber housing, the cylindrical filter, and the cup-shaped cover member being disposed such that an outer circumferential surface of the circumferential wall of the cover member abuts against an inner circumferential surface of the cylindrical filter, the bottom surface of the ignition device chamber housing is covered, from outside, by the bottom surface of the cover member, and a gap is formed between an inner circumferential surface of the circumferential wall of the cover member and an outer circumferential surface of the circumferential wall of the ignition device chamber housing.

A second aspect of the present invention (hereinafter, referred to as a "second aspect") provides a gas generator, including:

an outer shell housing having a top plate, a bottom plate and a circumferential wall provided with a gas discharge port;

in the outer shell housing, a combustion chamber accommodating a gas generating agent, a cylindrical filter, and an ignition device disposed in a cup-shaped ignition device chamber housing;

the cup-shaped ignition device chamber housing having a bottom surface, a circumferential wall and an opening and being disposed such that the bottom surface thereof faces the top plate of the outer shell housing and an end surface of the opening thereof abuts against the bottom plate of the outer shell housing;

a length from an upper end surface to a lower end surface of the cylindrical filter being shorter than a distance from the top plate to the bottom plate of the outer shell housing, and the cylindrical filter being disposed along a central axis of the outer shell housing such that the upper end surface faces the top plate and the lower end surface faces the combustion chamber; and a disk-shaped cover member further being disposed, and the disk-shaped cover member being disposed so as to abut against the upper end surface of the cylindrical filter and face the top plate of the outer shell housing.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In U.S. Pat. No. 6,234,521 B1, since a combustion gas flows radially outward from the combustion chamber 484, in order to use the coolant/filter 467 effectively, a length of the circumferential wall 493 of the plate member 491 has to be restricted.

In U.S. Pat. No. 8,714,091 B2, during actuation, a top plate 12 deforms due to pressure, the filter also deforms in a state of being in contact with the top plate 12, and thereby, an inner circumferential surface 74 of the filter 70 acts as an inflow surface for gas in addition to a lower surface 72. Consequently, combustion residues readily adhere to an inner surface (in a portion hidden by a bottom plate 33 of the cup-shaped container 31) of the top plate, which has a room for improvement.

In U.S. Pat. No. 8,585,086 B2, part of a combustion gas passing through the filter 50 readily comes in contact with the top plate 11a via a communication hole 66, which has a room for improvement.

The present invention provides a gas generator including a structure which suppresses adherence of combustion residues to a top plate of a housing and inhibits a rise in temperature of the top plate during and after actuation.

An outer shell housing can be a housing used in a known gas generator, in which a diffuser shell having a plurality of gas discharge ports and a closure shell are joined at a contact portion. The outer shell housing is made of a metal such as iron or stainless steel.

A gas generating agent same as that used in a known gas generator is accommodated in a combustion chamber.

An ignition device accommodated in a cup-shaped ignition device chamber housing can be an electric igniter same as that used in a known gas generator, or a combination of the electric igniter and a transfer charge. The igniter can be an igniter same as that used in a known gas generator, in which an igniter main body including an ignition portion is integrated with a metallic collar by a resin. The igniter is mounted to a hole formed in a bottom plate of the outer shell housing in a similar manner to a known gas generator.

The cup-shaped ignition device chamber housing needs only to be disposed such that an opening is located on the side of the bottom plate of the outer shell housing. For example, the cup-shaped ignition device chamber housing can be disposed by employing one of the following methods: a method of forming a flange at the opening of the cup-shaped ignition device chamber housing and welding and fixing the flange onto the bottom plate of the outer shell housing; a method of press-fitting the cup-shaped ignition device chamber housing to a metallic collar of the igniter; and a method of deforming part of the cup-shaped ignition device chamber housing similarly to U.S. Pat. No. 8,777,258B2, and fitting into a groove of the outer shell housing. The cup-shaped ignition device chamber housing is made of a metal such as iron or stainless steel.

A cylindrical filter can be made of the same material and have the same structure as those of a known gas generator.

A length of the cylindrical filter needs only to be shorter than a distance from a top plate to a bottom plate of the outer shell housing and can be, for example, approximately 30% to 50% of the distance from the top plate to the bottom plate of the outer shell housing. An upper end surface of the cylindrical filter may face the top plate of the outer shell housing with a gap therebetween or may abut against the top plate of the outer shell housing. The cylindrical filter is preferably disposed such that a central axis of the cylindrical filter coincides with a central axis of the outer shell housing.

An outer circumferential surface of the cylindrical filter may abut against a circumferential wall of the outer shell housing provided with a gas discharge port, but preferably, the outer circumferential surface of the cylindrical filter is disposed at a distance from the circumferential wall of the outer shell housing provided with a gas discharge port. As a method of disposing the cylindrical filter in this manner, a method of using a cylindrical retainer capable of supporting both the outer circumferential surface and a lower end surface closer to the outer circumferential surface of the cylindrical filter is preferable.

A cup-shaped cover member is made of a metal such as iron or stainless steel or made of ceramic. A length of a circumferential wall of the cup-shaped cover member is equal to or more than a length of the cylindrical filter from the upper end surface to the lower end surface thereof.

An outer diameter of the cup-shaped cover member and an inner diameter of the cylindrical filter are preferably adjusted such that an outer circumferential surface of the circumferential wall of the cup-shaped cover member and an inner circumferential surface of the cylindrical filter come into contact with each other and the cup-shaped cover member is press-fitted into a hole of the cylindrical filter.

A bottom surface of the cup-shaped cover member and a bottom surface of the ignition device chamber housing may be in contact with each other or may face each other with a gap therebetween.

A length of the cup-shaped cover member and a length of the ignition device chamber housing are adjusted such that the cup-shaped cover member does not detach from the ignition device chamber housing even when the top plate of the outer shell housing expands axially outward during actuation and, in accordance therewith, the cup-shaped cover member moves in the same direction. For example, when the length of the ignition device chamber housing (a length of the circumferential wall thereof) is 1, the length of the cup-shaped cover member (a length of the circumferential wall thereof) preferably ranges from 0.3 to 0.6.

Moreover, a degree of expansion of the top plate of the outer shell housing can be determined in advance by a calculation and an experiment taking into account a material of the outer shell housing and pressure generated by combustion of the gas generating agent.

A gap is formed between an inner circumferential surface of the circumferential wall of the cup-shaped cover member and an outer circumferential surface of the circumferential wall of the ignition device chamber housing. The gap is formed by adjusting an inner diameter of the cup-shaped cover member and an outer diameter of the cup-shaped ignition device chamber housing. For example, the gap has a width of approximately 1 to 5 mm.

In the gas generator according to the first aspect, a combustion gas containing combustion residues (for example, including metal in a molten state) generated inside the combustion chamber is discharged from the gas discharge port via the cylindrical filter. At this point, if the cup-shaped cover member according to the first aspect is not provided, part of the combustion gas containing the combustion residues enters into the gap between the cylindrical filter and the ignition device chamber housing, and the combustion residues adhere to the top plate of the outer shell housing and cause the top plate to become overheated.

However, with the gas generator according to the first aspect, since the cover member is disposed between the cylindrical filter and the ignition device chamber housing and a gap is formed between the ignition device chamber housing and the cover member, the combustion gas enters the gap and subsequently the combustion residues contained in the combustion gas are retained inside the cover member. Therefore, since the top plate of the outer shell housing and the combustion residues never come into contact with each other, the top plate of the outer shell housing is prevented from being overheated.

In order to further suppress transfer of heat to the top plate, a plurality of depressions and protrusions may be formed on a bottom surface of the cup-shaped cover member on the side of the top plate to reduce a contact area of the cup-shaped cover member with a top plate of an outer shell container.

It is preferable in the gas generator according to the first aspect that the cup-shaped cover member has a plurality of independent protrusions that protrude radially inward, on the inner circumferential surface of the circumferential wall, and the plurality of independent protrusions of the cover member abut against the outer circumferential surface of the circumferential wall of the ignition device chamber housing.

The plurality of the independent protrusions are provided so that the cup-shaped cover member is securely fixed and a gap is readily formed between the inner circumferential surface of the circumferential wall of the cup-shaped cover member and the outer circumferential surface of the circumferential wall of the ignition device chamber housing.

Further, the plurality of the independent protrusions are preferably arranged to allow the combustion gas containing the combustion residues to flow easily in the axial direction. For this purpose, preferably, the plurality of the independent protrusions (preferably, 2 to 4 protrusions) are disposed at intervals in a circumferential direction and, more preferably, the plurality of the independent protrusions are disposed at intervals in a circumferential direction and at intervals in a longitudinal direction (preferably, 2 to 4 protrusions in the circumferential direction and 2 or 3 protrusions in the longitudinal direction).

The plurality of the independent protrusions may be a plurality of elongated independent rib-like protrusions disposed at intervals in the circumferential direction (preferably, 2 to 4 protrusions in the circumferential direction).

Alternatively, a plurality of independent protrusions can be formed on an outer surface of the circumferential wall of the cup-shaped ignition device chamber housing instead of the plurality of the independent protrusions formed on the inner circumferential surface of the circumferential wall of the cup-shaped cover member.

It is preferable in the gas generator according to the first aspect that the cup-shaped cover member has a flange at the opening thereof, and the flange abuts against an inner circumferential edge portion of the cylindrical filter at the lower end surface thereof facing the combustion chamber.

The use of a cup-shaped cover member having the flange at the opening thereof is preferable because the combustion gas hardly enters between the cylindrical filter and the cup-shaped cover member but flows easily into the gap between the ignition device chamber housing and the cover member.

Further, during actuation, since the top plate of the outer shell housing expands axially outward due to an increase in internal pressure, the cylindrical filter and the cup-shaped cover member move therewith in the axial direction. At this point, with the use of the cup-shaped cover member having a flange, the cylindrical filter and the cup-shaped cover member move together in the axial direction while maintaining a state where the flange abuts against an inner circumferential edge portion of the cylindrical filter at the lower end surface thereof facing the combustion chamber. Thereby, the combustion gas does not pass between the cylindrical filter and the cup-shaped cover member but flows into the gap between the cup-shaped cover member and the ignition device chamber housing.

It is preferable in the gas generator according to the first aspect that, in the cup-shaped cover member, a length (L1) of the circumferential wall in the axial direction is longer than a length (L2) of the cylindrical filter in the axial direction (L1>L2), and a distal end portion of the circumferential wall protrudes beyond the lower end surface of the cylindrical filter toward the combustion chamber.

It is preferable that L1>L2 is satisfied and the distal end portion of the circumferential wall of the cup-shaped cover member protrudes beyond the lower end surface of the cylindrical filter toward the combustion chamber. When the distal end portion of the circumferential wall protrudes in this manner, the combustion gas containing the combustion residues is unlikely to enter between the cylindrical filter and the cup-shaped cover member. L1/L2 is preferably within a range of 1.1 to 2.0 and more preferably within a range of 1.1 to 1.5.

A gas generator according to a second aspect is the same as the gas generator according to the first aspect except that a cover member used therein is different from that in the gas generator according to the first aspect and the cylindrical filter and the ignition device chamber housing are disposed differently.

In the gas generator according to the second aspect, a disk-shaped cover member is used as the cover member, and the disk-shaped cover member is disposed to abut against the upper end surface of the cylindrical filter and face the top plate of the outer shell housing.

The disk-shaped cover member and an outer side of the bottom surface of the ignition device chamber housing may face each other with a gap therebetween or may abut against each other. The disk-shaped cover member and the top plate of the outer shell housing may face each other with a gap therebetween or may abut against each other. A slight gap may be formed between an outer circumferential edge portion of the disk-shaped cover member and the circumferential wall of the outer shell housing.

A gap may be provided between the ignition device chamber housing and the cylindrical filter or the ignition device chamber housing and the cylindrical filter may abut against each other.

In the gas generator according to the second aspect, a combustion gas containing combustion residues (for example, including metal in a molten state) generated inside the combustion chamber is discharged from the gas discharge port via the cylindrical filter. At this point, if the disk-shaped cover member according to the second aspect is not provided, part of the combustion gas containing the combustion residues enters the gap between the cylindrical filter and the ignition device chamber housing, reaches the top plate of the outer shell housing, and causes the top plate to become overheated.

However, in the gas generator according to the second aspect, since the disk-shaped cover member is disposed to abut against the upper end surface of the cylindrical filter and face the top plate, the combustion gas containing the combustion residues passes between the cylindrical filter and the cup-shaped ignition device chamber housing and then moves to the disk-shaped cover member but never comes in contact with the top plate.

Further, when the cylindrical filter moves axially outward during actuation, the disk-shaped cover member moves together, and as a result, the combustion residues are still prevented from coming in contact with the top plate.

Therefore, since the top plate of the outer shell housing and the combustion residues never come into contact with each other, the top plate of the outer shell housing is prevented from being overheated.

It is preferable in the gas generator according to the second aspect that the disk-shaped cover member has a disk portion and an annular wall extending in a direction of the bottom plate from an outer circumferential portion of the disk portion, and the disk-shaped cover member is disposed such that the disk portion abuts against both the upper end surface of the cylindrical filter and the top plate of the outer shell housing and the annular wall abuts against an outer circumferential surface closer to the upper end surface of the cylindrical filter.

With the use of the disk-shaped cover member having an annular wall, the disk-shaped cover member abuts against both the upper end surface and the outer circumferential surface close to the upper end surface of the cylindrical filter. Therefore, the combustion gas containing the combustion residues passing between the disk-shaped cover member and the upper end surface of the cylindrical filter is prevented from leaking out to the outer circumference of the cylindrical filter.

It is preferable in the gas generator according to the second aspect that a gap is formed between the inner circumferential surface of the cylindrical filter and the outer surface of the circumferential wall of the ignition device chamber housing. The presence of a gap between the inner circumferential surface of the cylindrical filter and the outer surface of the circumferential wall of the ignition device chamber housing is preferable because the gap makes it difficult for heat accumulated in the ignition device chamber housing after actuation to be transferred to the top plate via the filter.

In the gas generator according to the present invention, a rise in temperature of the top plate of the outer shell housing during actuation and after actuation is suppressed.

The gas generator according to the present invention can be used as a gas generator of an airbag apparatus mounted on an automobile.

Figure 1:
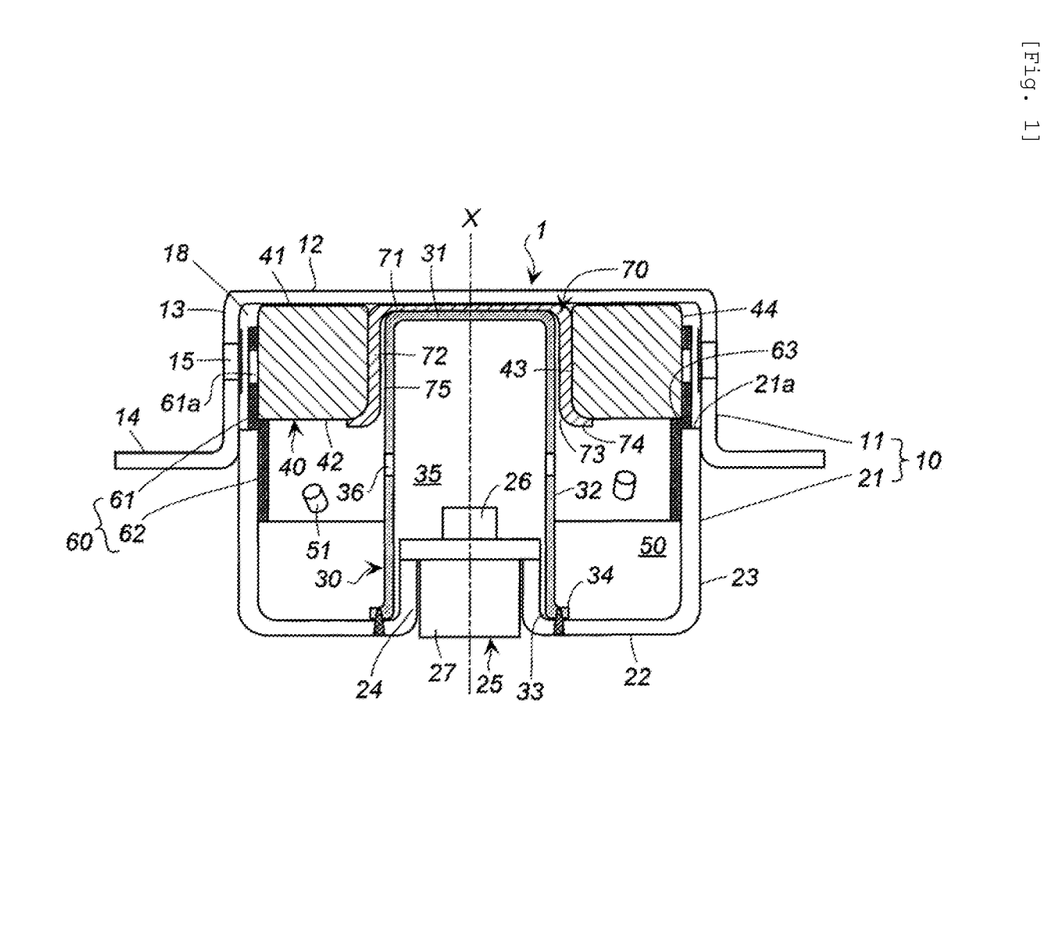
FIG. 1 shows a cross-sectional view in a direction of an axis X of a gas generator according to the present invention (the first aspect)

Embodiments of the Invention (1) Gas Generator Shown in FIG. 1

An outer shell housing 10 of a gas generator 1 includes a diffuser shell 11 and a closure shell 21. The diffuser shell 11 has a top plate 12 and an upper circumferential wall 13, and has a flange 14 at an opening thereof. A plurality of gas discharge ports 15 are formed in the upper circumferential wall 13, and the gas discharge ports 15 are closed from inside by a seal tape. The closure shell 21 has a bottom plate 22 and a lower circumferential wall 23, and a hole for mounting an igniter 25 is formed in a central portion of the bottom plate 22.

In the embodiment shown in FIG. 1, an outer circumferential surface of the lower circumferential wall 23 on the side of the opening of the closure shell 21 is fitted into an inner circumferential surface of the upper circumferential wall 13 on the side of the opening of the diffuser shell 11, and an annular stepped surface which is an end surface 21a at the opening of the closure shell 21 is obtained between the upper circumferential wall 13 and the lower circumferential wall 23. The diffuser shell 11 and the closure shell 21 are welded in a contact portion.

The igniter 25 is an igniter used in a known gas generator and is, for example, an igniter in which an igniter collar 27 and an igniter main body including an ignition portion 26 are integrated by a resin. The igniter 25 is mounted by fitting the igniter collar 27 into a cylindrical mounting portion 24 formed at the hole of the bottom plate 22 of the closure shell 21.

A cup-shaped ignition device chamber housing 30 is disposed in the outer shell housing 10. The outer shell housing 10 and the cup-shaped ignition device chamber housing 30 are disposed such that the central axes (axes X) thereof coincides with each other.

The cup-shaped ignition device chamber housing 30 has a bottom surface 31, a circumferential wall 32 and an opening 33 having a short flange 34. The inside of the cup-shaped ignition device chamber housing 30 is an ignition device chamber 35. A plurality of flame-transferring holes 36 are formed in the circumferential wall 32 of the cup-shaped ignition device chamber housing 30. A transfer charge not shown in the drawing (including a gas generating agent that functions as a transfer charge) is accommodated in the ignition device chamber 35. In the cup-shaped ignition device chamber housing 30, the bottom surface 31 faces the top plate 12, the flange 34 abuts against the bottom plate 22 and the abutting portion is welded.

A cylindrical filter 40 has an upper end surface 41, a lower end surface 42, an inner circumferential surface 43, and an outer circumferential surface 44, and a length from the upper end surface 41 to the lower end surface 42 is shorter than a distance from the top plate 12 to the bottom plate 22 of the outer shell housing 10. The cylindrical filter 40 is disposed such that the central axis thereof coincides with the central axis (the axis X) of the outer shell housing 10, the upper end surface 41 abuts against an inner surface of the top plate 12 and the lower end surface 42 faces a combustion chamber 50.

In the embodiment shown in FIG. 1, the cylindrical filter 40 is disposed in combination with a cylindrical retainer 60.

The cylindrical retainer 60 includes an upper retainer 61 and a lower retainer 62 whose inner diameter and outer diameter are smaller than those of the upper retainer 61, and annular flat surfaces 63 are formed between the upper retainer 61 and the lower retainer 62 by respective differences in the inner diameters and the outer diameters. A plurality of through holes 61a for allowing the combustion gas to pass therethorough are formed in the upper retainer 61.

The annular flat surface 63 facing the bottom plate 22 abuts against the end surface 21a of the opening of the closure shell 21, and the annular flat surface 63 facing the top plate 12 abuts against the lower end surface 42 closer to the outer circumferential surface 44 of the cylindrical filter 40. A cylindrical gap 18 is formed between the upper retainer 61 and the upper circumferential wall 13 provided with the gas discharge ports 15.

The combustion chamber 50 is a space inside the outer shell housing 10 excluding the cup-shaped ignition device chamber housing 30 (the ignition device chamber 35) and the cylindrical filter 40, and accommodates a predetermined amount of a gas generating agent 51.

A cup-shaped cover member 70 is disposed between the cup-shaped ignition device chamber housing 30 and the cylindrical filter 40. The cup-shaped cover member 70 has a bottom surface 71, a circumferential wall 72, and an opening 73, and has a flange 74 at the opening 73.

A length of the circumferential wall 72 of the cover member 70 is adjusted to a length such that the cup-shaped cover member 70 does not detach from the ignition device chamber housing 30 even when the top plate 12 of the outer shell housing deforms outward in the direction of the axis X during actuation and, in accordance therewith, the cup-shaped cover member 70 moves in a same direction. In the embodiment shown in FIG. 1, the bottom surface 71 of the cup-shaped cover member 70 is in a state of abutting against the top plate 12 and the bottom surface 31 of the ignition device chamber housing 30, and when a length of the circumferential wall 32 of the ignition device chamber housing 30 in the direction of the axis X is 1, a length of the cup-shaped cover member 70 (a length of the circumferential wall 72) is 0.4.

The ignition device chamber housing 30; the cylindrical filter 40, and the cup-shaped cover member 70 are disposed such that an outer circumferential surface of the circumferential wall 72 of the cover member 70 abuts against the inner circumferential surface 43 of the cylindrical filter 40, the bottom surface 31 of the ignition device chamber housing 30 is covered in an abutment state with the bottom surface 71 of the cover member 70 from outside, and a gap (a gap which allows inflow of combustion residues) 75 is formed between an inner circumferential surface of the circumferential wall 72 of the cover member 70 and an outer circumferential surface of the circumferential wall 32 of the ignition device chamber housing 30.

Furthermore, the flange 74 of the cover member 70 abuts against an inner circumferential edge portion of the lower end surface 42 facing the combustion chamber 50, of the cylindrical filter 40.

An interval of the gap 75 is maintained because the ignition device chamber housing 30 is fixed to the bottom plate 22 and the cover member 70 is supported by the ignition device chamber housing 30 and the cylindrical filter 40. However, a plurality of independent protrusions for maintaining the interval can be formed as required on the inner circumferential surface of the cover member 70.

An operation of the gas generator 1 shown in FIG. 1 will be described.

When the igniter 25 is actuated, the transfer charge in the ignition device chamber 35 is ignited and burned and combustion products (flame and high-temperature gas) are discharged into the combustion chamber 50 through the flame-transferring holes 36. The gas generating agent 51 is ignited and burned by the combustion products discharged into the combustion chamber 50 and a combustion gas is generated. The generated combustion gas enters the cylindrical filter 40 from the lower end surface 42 thereof and then enters the cylindrical gap 18 from the outer circumferential surface 44 of the cylindrical filter 40 and the through holes 61a of the upper retainer 61. Subsequently, the combustion gas ruptures the seal tape and is discharged from the gas discharge ports 15.

Among combustion residues contained in the combustion gas, the combustion residues passing through the cylindrical filter 40 are held in the cylindrical filter 40. Due to the presence of the flange 74 of the cover member 70, the combustion gas hardly flows between the inner circumferential surface 43 of the cylindrical filter 40 and the circumferential wall 72 of the cover member 70. The combustion residues entered into the gap (a combustion residue inflow space) 75 between the cup-shaped cover member 70 and the ignition device chamber housing 30 are held inside the cup-shaped cover member 70. Since the combustion residues do not adhere to the top plate 12 of the outer shell housing 10 as described above, a rise in temperature of an outer surface of the top plate 12 is suppressed as compared to a case where the combustion residues directly adhere to the top plate 12.

In addition, when the top plate 12 deforms outward in the direction of the axis X due to an increase in pressure of the combustion chamber 50, the cylindrical filter 40 and the cup-shaped cover member 70 move therewith outward in the direction of the axis X, and as a result, the combustion residues remain to be held in the cylindrical filter 40 and the cup-shaped cover member 70. Note that the cup-shaped cover member 70 does not detach from the ignition device chamber housing 30 even when the cup-shaped cover member 70 moves.

Furthermore, since a contact state between part of the outer circumferential surface 44 of the cylindrical filter 40 and the upper retainer 61 is maintained, the combustion gas is never discharged from the gas discharge ports 15 without passing through the cylindrical filter 40.

Figure 2:
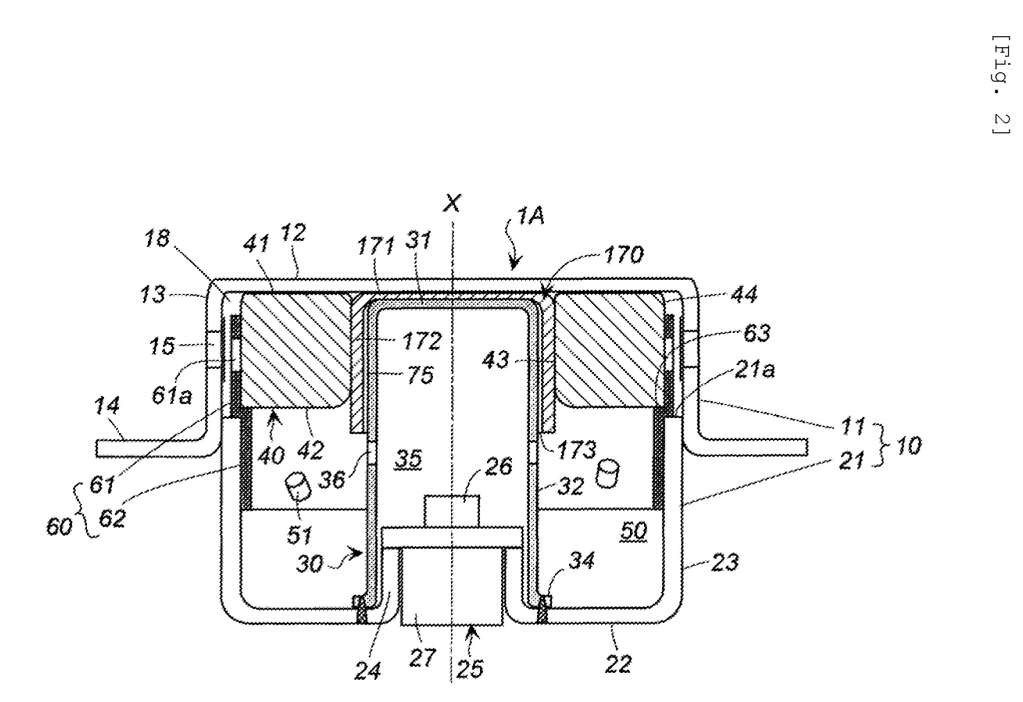
FIG. 2 shows a cross-sectional view in the direction of the axis X of a gas generator including a different cover member from that shown in FIG. 1.

(2) Gas Generator Shown in FIG. 2

A gas generator 1A shown in FIG. 2 is the same as the gas generator 1 shown in FIG. 1 except that a shape of a cup-shaped cover member is different from that shown in FIG. 1 and, in accordance therewith, an arrangement state of the cup-shaped cover member in relation to other parts differs from that shown in FIG. 1.

A cup-shaped cover member 170 is disposed between the cup-shaped ignition device chamber housing 30 and the cylindrical filter 40. The cup-shaped cover member 170 has a bottom surface 171, a circumferential wall 172, and an opening 173, but does not have a flange.

A length (L1) of the circumferential wall 172 of the cover member 170 (a length from an outer surface of the bottom surface 171 to a distal end surface of the circumferential wall 172) is longer than a length (L2) from the upper end surface 41 to the lower end surface 42 of the cylindrical filter 40 (L1>L2). In the embodiment shown in FIG. 2, L1/L2 is approximately 1.3. Therefore, the distal end portion of the circumferential wall 172 protrudes beyond the lower end surface 42 of the cylindrical filter 40 toward the combustion chamber 50.

The length of the circumferential wall 172 of the cover member 170 (the same length as L1 described above) is adjusted to a length such that the cup-shaped cover member 170 does not detach from the ignition device chamber housing 30 even when the top plate 12 of the outer shell housing deforms outward in the direction of the axis X during actuation and, in accordance therewith, the cup-shaped cover member 170 moves in a same direction.

Figure 3:
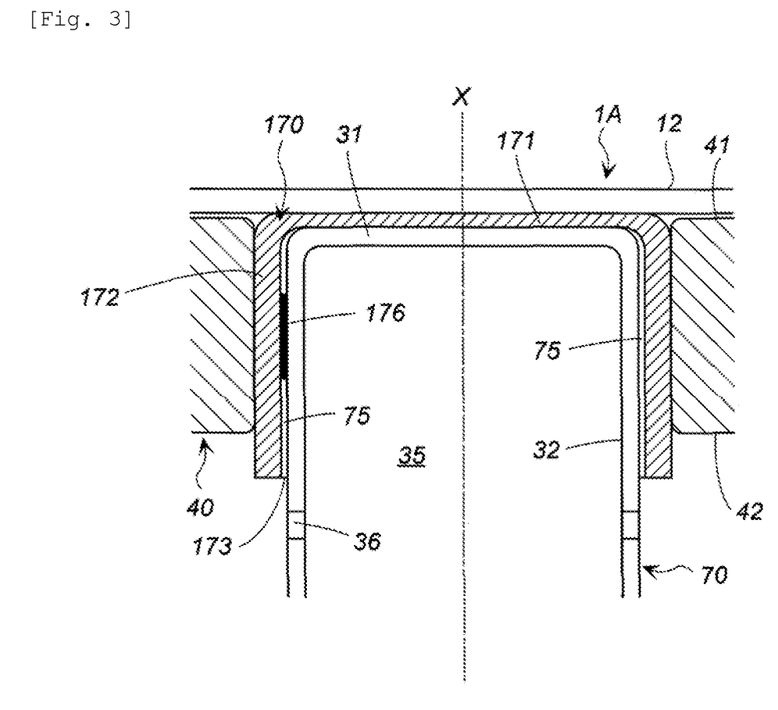
FIG. 3 shows a partial cross-sectional view in the direction of the axis X of a gas generator including a different cover member from those shown in FIGS. 1 and 2.

In the gas generator 1A shown in FIG. 2, as the cover member, such a cover member can be used in which a plurality of independent protrusions (ribs) 176 protruding radially inward are formed on an inner circumferential surface of the circumferential wall 172 of the cup-shaped cover member 170 as shown in FIG. 3.

In the embodiment shown in FIG. 3, three ribs 176 are formed at 120-degree intervals in a circumferential direction on the inner circumferential surface of the circumferential wall 172. A length of the ribs 176 is preferably about 30% to 50% of a length of the circumferential wall 172. A width of the ribs 176 is not particularly limited and is determined in view of strength and not inhibiting the inflow of the combustion residues. The three ribs 176 of the cup-shaped cover member 170 maintain an interval of the gap (the combustion residue inflow space) 75 by being abutted against the outer circumferential surface of the circumferential wall 32 of the ignition device chamber housing 30.

The gas generator 1A shown in FIG. 2 operates in a similar manner to the gas generator 1 shown in FIG. 1.

Among combustion residues contained in the combustion gas, the combustion residues passing through the cylindrical filter 40 are held in the cylindrical filter 40. Because a distal end of the cover member 170 protrudes into the combustion chamber 50, the combustion gas hardly flows between the inner circumferential surface 43 of the cylindrical filter 40 and the circumferential wall 172 of the cup-shaped cover member 170. The combustion residues entered into the gap (the combustion residue inflow space) 75 between the cup-shaped cover member 170 and the ignition device chamber housing 30 are held inside the cup-shaped cover member 170. Since the combustion residues do not adhere to the top plate 12 of the outer shell housing 10 as described above, a rise in temperature of an outer surface of the top plate 12 is suppressed as compared to a case where the combustion residues directly adhere to the top plate 12.

Further, when the top plate 12 deforms outward in the direction of the axis X due to an increase in pressure of the combustion chamber 50, the cylindrical filter 40 and the cup-shaped cover member 170 move therewith outward in the direction of the axis X, and as a result, the combustion residues remain to be held in the cylindrical filter 40 and the cup-shaped cover member 170. Note that the cup-shaped cover member 170 does not detach from the ignition device chamber housing 30 even when the cup-shaped cover member 170 moves.

Furthermore, since a contact state between the part of the outer circumferential surface 44 of the cylindrical filter 40 and the upper retainer 61 is maintained, the combustion gas is never discharged from the gas discharge ports 15 without passing through the cylindrical filter 40.

Figure 4:
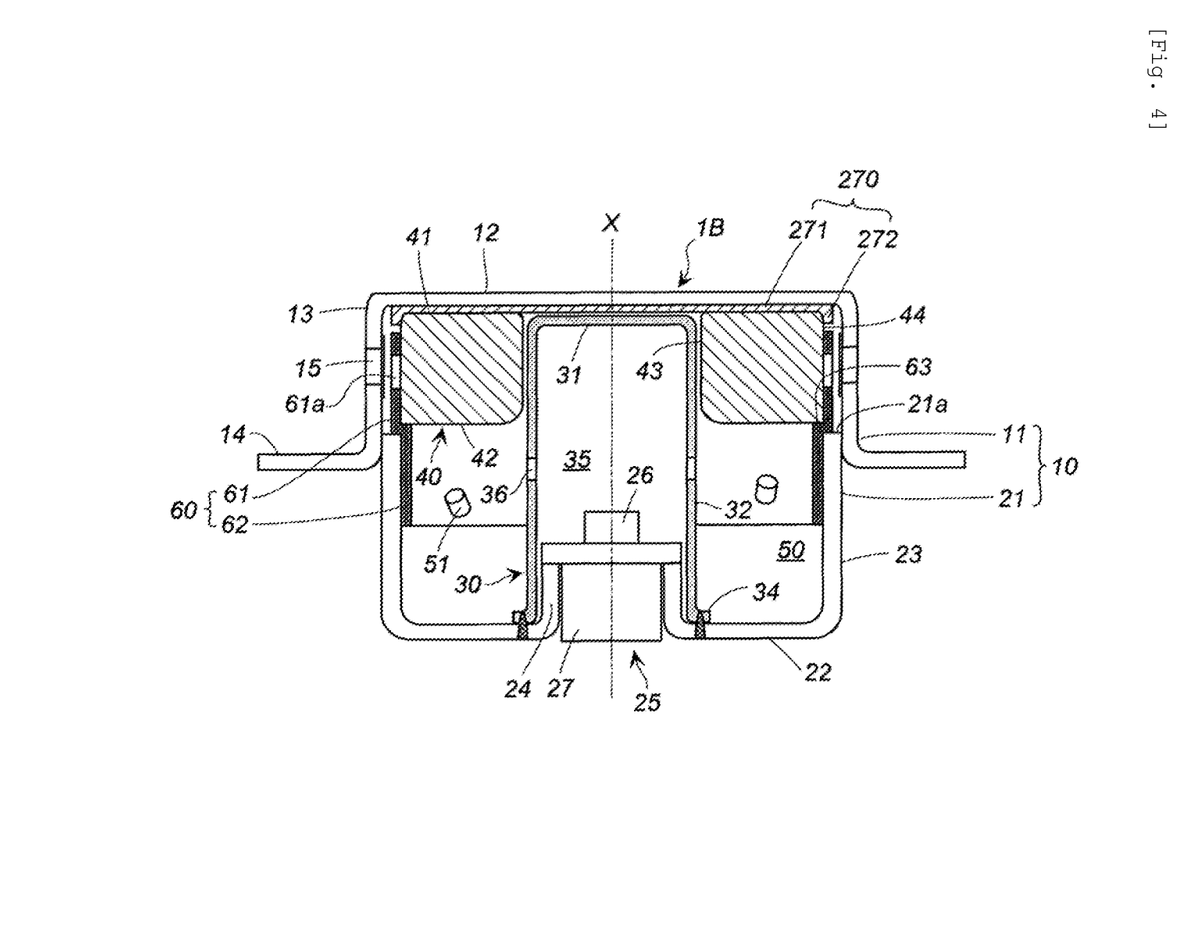
FIG. 4 shows a cross-sectional view in the direction of the axis X of a gas generator according to the present invention (the second aspect).

(3) Gas Generator Shown in FIG. 4

A gas generator 1B shown in FIG. 4 is the same as the gas generator 1 shown in FIG. 1 except that a shape of a cover member is different from that shown in FIG. 1 and, in accordance therewith, an arrangement state of the cover member in relation to other parts is different from that shown in FIG. 1.

A disk-shaped cover member 270 is disposed between the cylindrical filter 40 and the top plate 12 of the outer shell housing. The disk-shaped cover member 270 has a disk portion 271 and an annular wall 272 extending in a direction of the bottom plate 22 from an outer circumferential portion of the disk portion 271.

The disk portion 271 of the disk-shaped cover member 270 abuts against the upper end surface 41 of the cylindrical filter 40 and may abut against the top plate 12 or may face the top plate 12 at a distance. The disk portion 271 of the disk-shaped cover member 270 faces the bottom surface 31 of the ignition device chamber housing with a gap therebetween, but the disk portion 271 may abut against the bottom surface 31.

The annular wall 272 of the disk-shaped cover member 270 is disposed to be abutted against the outer circumferential surface 44 closer to the upper end surface 41 of the cylindrical filter 40. A gap is formed between the annular wall 272 of the disk-shaped cover member 270 and the upper circumferential wall 13 of the diffuser shell 11. A gap is formed between the annular wall 272 of the disk-shaped cover member 270 and the upper retainer 61.

In the embodiment shown in FIG. 4, a gap is formed between the inner circumferential surface 43 of the cylindrical filter 40 and an outer surface of the circumferential wall 32 of the ignition device chamber housing 30.

The gas generator 1B shown in FIG. 4 operates in a similar manner to the gas generator 1 shown in FIG. 1.

Among combustion residues contained in the combustion gas, the combustion residues passing through the cylindrical filter 40 are held in the cylindrical filter 40. Because a gap is formed between the inner circumferential surface 43 of the cylindrical filter 40 and the circumferential wall 32 of the ignition device chamber housing 30, a heat of the ignition device chamber housing 30 after actuation is hardly transferred to the cylindrical filter 40.

Since the disk-shaped cover member 270 is disposed between the cylindrical filter 40 and the ignition device chamber housing 30, and the top plate 12, when the combustion residues pass through the cylindrical filter 40 and when the combustion residues pass between the inner circumferential surface 43 of the cylindrical filter 40 and the circumferential wall 32 of the ignition device chamber housing 30, the combustion residues adhere to and are held by the disk-shaped cover member 270. Since the combustion residues do not adhere to the top plate 12 of the outer shell housing 10 as described above, a rise in temperature of an outer surface of the top plate 12 is suppressed as compared to a case where the combustion residues directly adhere to the top plate 12.

Further, when the top plate 12 deforms outward in the direction of the axis X due to an increase in pressure of the combustion chamber 50, the cylindrical filter 40 and the cover member 270 move therewith outward in the direction of the axis X, and as a result, the combustion residues remain to be held in the cylindrical filter 40 and the cover member 270.

Furthermore, since a contact state between the part of the outer circumferential surface 44 of the cylindrical filter 40 and the upper retainer 61 is maintained, the combustion gas is never discharged from the gas discharge ports 15 without passing through the cylindrical filter 40.

EXAMPLES

Example 1, Comparative Example 1

The gas generator 1 shown in FIG. 1 (Example 1) and a gas generator with a same structure as FIG. 1 except that the cup-shaped cover member 70 was not provided (Comparative Example 1) were prepared.

Respective outer shell housings, ignition device chamber housings, and cover members were all made of stainless steel. In the gas generator of Comparative Example 1, an outer diameter of the ignition device chamber housing was increased so that the ignition device chamber housing is abutted against the cylindrical filter.

Using the gas generators according to Example 1 and Comparative Example 1, an outer surface temperature of each of the top plates during actuation was measured by the following method.

Measurement Method

Object gas generator: the gas generators of Example 1 and Comparative Example 1 were temperature-controlled to 85° C. in advance. The gas generators were temperature-controlled to 85° C. in advance in order to simulate a case where a vehicle is left outdoors for a long time in summer and reaches a high-temperature state (under a severe thermal condition) and to verify a temperature rise-suppression effect in such a case.

Measuring instrument: thermocouple

Measured location: central portion of top plate of outer shell housing

Material and thickness of cover member 70: iron, t=0.5 mm

Material of diffuser shell: iron

An electric current was passed through the igniters of the gas generators, and a maximum temperature of the top plates after actuating the gas generators in a normal mode was measured. As a result, the temperature of the top plate of the gas generator of Example 1 was approximately 540° C. and the temperature of the top plate of the gas generator of Comparative Example 1 was approximately 660° C. This result confirmed a temperature rise suppression effect with respect to the top plate by the cover member.

Note that the maximum temperature of the top plate of the housing after actuation also varies depending on a gas generating agent used, an environment temperature during actuation, a material of the cover member, and the like. Further, damage and melting of an airbag are also related to materials composing the airbag. Although the advantageous effect of the invention is confirmed by Example 1, a temperature rise-suppression effect with respect to the top plate of the housing and a consequential damage-suppression effect with respect to an airbag can be adjusted by setting an optimal combination from the various options described above.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   an outer shell housing having a top plate, a bottom plate and a circumferential wall provided with a gas discharge port;
   in the outer shell housing, a combustion chamber accommodating a gas generating agent, a cylindrical filter, and an ignition device disposed in a cup-shaped ignition device chamber housing;
   the combustion chamber being a space inside the outer shell housing excluding the cup-shaped ignition device chamber housing and the cylindrical filter;
   the cup-shaped ignition device chamber housing having a bottom surface, a circumferential wall and an opening and being disposed such that the bottom surface thereof faces the top plate of the outer shell housing and an end surface of the opening thereof abuts against the bottom plate of the outer shell housing;
   a length from an upper end surface to a lower end surface of the cylindrical filter being shorter than a distance from the top plate to the bottom plate of the outer shell housing, and the cylindrical filter being disposed along a central axis of the outer shell housing such that i) the upper end surface faces the top plate and ii) the lower end surface faces the combustion chamber to define a part of the space of the combustion chamber;
   a cup-shaped cover member being further disposed between the cup-shaped ignition device chamber housing and the cylindrical filter;
   the cup-shaped cover member having a bottom surface, a circumferential wall and an opening; and
   the ignition device chamber housing, the cylindrical filter, and the cup-shaped cover member being disposed such that
   an outer circumferential surface of the circumferential wall of the cover member abuts against an inner circumferential surface of the cylindrical filter,
   the bottom surface of the ignition device chamber housing is covered, from outside, by the bottom surface of the cover member, and
   a gap is formed between an inner circumferential surface of the circumferential wall of the cover member and an outer circumferential surface of the circumferential wall of the ignition device chamber housing.

2. The gas generator according to claim 1, wherein the cup-shaped cover member has a plurality of independent protrusions that protrude radially inward, on the inner circumferential surface of the circumferential wall, and the plurality of independent protrusions of the cover member abut against the outer circumferential surface of the circumferential wall of the ignition device chamber housing.

3. The gas generator according to claim 1, wherein the cup-shaped cover member has a flange at the opening thereof, and the flange abuts against an inner circumferential edge portion of the cylindrical filter at the lower end surface thereof facing the combustion chamber.

4. The gas generator according to claim 1, wherein, in the cup-shaped cover member, a length (L1) of the circumferential wall in the axial direction is longer than a length (L2) of the cylindrical filter in the axial direction (L1>L2) and a distal end portion of the circumferential wall protrudes beyond the lower end surface of the cylindrical filter toward the combustion chamber.

* * * * *